United States Patent
Smith (10) Patent No.: US 7,133,506 B1
(45) Date of Patent: Nov. 7, 2006

(54) MESSAGE DELIVERY SYSTEMS AND METHODS

(75) Inventor: Benjamin V. Smith, Alabaster, AL (US)

(73) Assignee: BellSouth Intellectual Property Corp., Wilmington, DE (US)

(*) Notice: Subject to any disclaimer, the term of this patent is extended or adjusted under 35 U.S.C. 154(b) by 54 days.

(21) Appl. No.: 10/217,283

(22) Filed: Aug. 12, 2002

(51) Int. Cl.
H04M 1/64 (2006.01)

(52) U.S. Cl. .............. 379/88.25; 379/82; 379/211.03

(58) Field of Classification Search ............. 379/67.1, 379/69, 79, 87, 68, 88, 88.16, 114.01, 211.03; 705/14, 1, 8
See application file for complete search history.

(56) References Cited

U.S. PATENT DOCUMENTS

| | | | |
|---|---|---|---|
| 4,278,844 A | 7/1981 | Jones | |
| 5,060,255 A | 10/1991 | Brown | |
| 5,177,685 A | 1/1993 | Davis et al. | |
| 5,333,180 A * | 7/1994 | Brown et al. | 379/88.06 |
| 5,438,568 A | 8/1995 | Weisser, Jr. | |
| 5,583,976 A | 12/1996 | Bullard, Jr. | |
| 5,586,169 A * | 12/1996 | Pinard et al. | 379/82 |
| 5,596,627 A | 1/1997 | Solomon et al. | |
| 5,742,905 A * | 4/1998 | Pepe et al. | 455/461 |
| 5,854,835 A | 12/1998 | Montgomery | |
| 5,867,498 A | 2/1999 | Gillman et al. | |
| 5,999,611 A | 12/1999 | Tatchell et al. | |
| 6,009,409 A * | 12/1999 | Adler et al. | 705/14 |
| 6,052,598 A | 4/2000 | Rudrapatna | |
| 6,160,877 A | 12/2000 | Tatchell et al. | |
| 6,161,128 A | 12/2000 | Smyk | |
| 6,181,996 B1 | 1/2001 | Chou et al. | |
| 6,188,757 B1 | 2/2001 | Malik | |
| 6,282,281 B1 | 8/2001 | Low | |
| 6,298,122 B1 | 10/2001 | Horne | |
| 6,310,939 B1 | 10/2001 | Varney | |
| 6,317,058 B1 | 11/2001 | Lemelson et al. | |
| 6,377,993 B1 | 4/2002 | Brandt | |
| 6,381,316 B1 | 4/2002 | Joyce et al. | |
| 6,480,783 B1 | 11/2002 | Myr | |
| 6,556,997 B1 * | 4/2003 | Levy | 707/10 |
| 6,647,106 B1 | 11/2003 | Hussain et al. | |
| 6,650,902 B1 | 11/2003 | Richton | |
| 6,677,894 B1 | 1/2004 | Sheynblat | |
| 6,741,188 B1 | 5/2004 | Miller | |
| 6,785,551 B1 | 8/2004 | Richard | |
| 6,888,929 B1 * | 5/2005 | Saylor et al. | 379/88.16 |
| 2001/0029425 A1 | 10/2001 | Myr | |
| 2001/0036258 A1 | 11/2001 | Sugla | |
| 2001/0046280 A1 | 11/2001 | Crockett | |
| 2002/0027512 A1 | 3/2002 | Horita et al. | |

(Continued)

OTHER PUBLICATIONS

"Bell Labs Technology: A soft handoff for improved service," printed from http://www.bell-labs.com/technology/wireless/soft.html Internet site, accessed on Jun. 19, 2002, 1 page.

(Continued)

Primary Examiner—Gerald Gauthier
(74) Attorney, Agent, or Firm—Withers & Keys, LLC (57) ABSTRACT

An apparatus for allowing a calling party to transmit a message for scheduled delivery from a network-enabled device. The apparatus includes a server for receiving a message request in response to a command from the network-enabled device, for generating one or more message addresses from the message request, and for transmitting the message request to one or more telecommunication networks corresponding to the one or more message addresses.

18 Claims, 3 Drawing Sheets

U.S. PATENT DOCUMENTS

| | | | |
|---|---|---|---|
| 2002/0036584 | A1 | 3/2002 | Jocoy et al. |
| 2002/0085698 | A1 | 7/2002 | Liebenow |
| 2002/0101360 | A1 | 8/2002 | Schrage |
| 2002/0126708 | A1* | 9/2002 | Skog et al. ................. 370/522 |
| 2003/0043983 | A1 | 3/2003 | Pelletier |
| 2004/0246147 | A1 | 12/2004 | von Grabe |

OTHER PUBLICATIONS

"Bell Labs Technology: Customers want more data services," printed from http://www.bell-labs.com/technology/wireless/customerswantdata.html Internet site, accessed on Jun. 19, 2002, 1 page.

"Bell Labs Technology: Early mobile telephone service," printed from http://www.bell-labs.com/technology/wireless/earlyservice.html Internet site, accessed on Jun. 19, 2002, 2 pages.

"Bell Labs Technology: Focusing on wireless transmission—everywhere," printed from http://www.bell-labs.com/technology/wireless/everywhere.html Internet site, accessed on Jun. 19, 2002, 1 page.

"Bell Labs Technology: How do I receive a moble call?" printed from http://www.bell-labs.com/technology/wireless/receive.html Internet site, accessed on Jun. 19, 2002, 1 page.

"Bell Labs Technology: How does a mobile call reach its destination?" printed from http://www.bell-labs.com/technology/wireless/destination.html Internet site, accessed on Jun. 19, 2002, 2 pages.

"Bell Labs Technology: How is a mobile system designed?" printed from http://www.bell-labs.com/technology/wireless/design.html Internet site, accessed on Jun. 19, 2002, 1 page.

"Bell Labs Technology: How is Lucent fueling the Untethered Revolution?" printed from http://www.bell-labs.com/technology/wireless/fueling.html Internet site, accessed on Jun. 19, 2002, 1 page.

"Bell Labs Technology: Let's make a mobile phone call," printed from http://www.bell-labs.com/technology/wireless/call.html Internet site, accessed on Jun. 19, 2002, 1 page.

"Bell Labs Technology: Lucent's support of international standards," printed from http://www.bell-labs.com/technology/wireless/lucent.html Internet site, accessed on Jun. 19, 2002, 1 page.

"Bell Labs Technology: Mobile wireless means wireless access," printed from http://www.bell-labs.com/technology/wireless/mobileaccess.html Internet site, accessed on Jun. 19, 2002, 2 pages.

"Bell Labs Technology: Pinpointing your location," printed from http://www.bell-labs.com/technology/wireless/pinpoint.html Internet site, accessed on Jun. 19, 2002, 1 page.

"Bell Labs Technology: Slicing up the cellular pie," printed from http://www.bell-labs.com/technology/wireless/pie.html Internet site, accessed on Jun. 19, 2002, 1 page.

"Bell Labs Technology: Switching a mobile call at 55 miles per hour," printed from http://www.bell-labs.com/technology/wireless/switching.html Internet site, accessed on Jun. 19, 2002, 2 pages.

"Bell Labs Technology: There are some limits on wireless data transmission," printed from http://www.bell-labs.com/technology/wireless/limitsondata.html Internet site, accessed on Jun. 19, 2002, 1 page.

"Bell Labs Technology: Too many technological standards," printed from http://www.bell-labs.com/technology/wireless/standards.html Internet site, accessed on Jun. 19, 2002, 1 page.

"Bell Labs Technology: Understanding Wireless Mobile Communications," printed from http://www.bell-labs.com/technology/wireless/ Internet site, accessed on Jun. 19, 2002, 2 pages.

"Bell Labs Technology: What if I've moved out of my service porvider's area?" printed from http://www.bell-labs.com/technology/wireless/moved.html Internet site, accessed on Jun. 19, 2002, 1 page.

"Bell Labs Technology: What is a 'cell'?" printed from http://www.bell-labs.com/technology/wireless/cell.html Internet site, accessed on Jun. 19, 2002, 2 pages.

"Bell Labs Technology: What's hot today? Wireless data!" printed from http://www.bell-labs.com/technology/wireless/hotdata.html Internet site, accessed on Jun. 19, 2002, 1 page.

"Bell Labs Technology: What's the difference between 'cellular' and 'PCS'?" printed from http://www.bell-labs.com/technology/wireless/difference.html Internet site, accessed on Jun. 19, 2002, 1 page.

"Cingluar Wireless Selects TruePosition® as Location Technology Provider for its Nationwide Wireless Network," printed from http://www.trueposition.com/news_cingular.html Internet site, accessed on Nov. 11, 2001, 2 pages.

"HeyAnita—Engaging your world through voice," printed from http://www.heyanita.com/p_login2.asp Internet site, accessed on Jun. 10, 2002, 1 page.

"HeyAnita—Engaging your world through voice," printed from http://www.heyanita.com/t_products.asp Internet site, accessed on Jun. 10, 2002, 4 pages.

"Home Toys Article," printed from http://www.hometoys.com/htinews/oct99/articles/panja/panja.htm Internet site, accessed on Jun. 10, 2002, 3 pages.

"how 911 works," printed from http://contact.bellsouth.com/email/bbs/phase2/how911works.html Internet site, accessed on Jun. 19, 2002, 6 pages.

"IEC: Wireless Intelligent Network (WIN)," printed from http://www.iec.org/online/tutorials/win/topic01.html?Back.x=17&Back.y=14 Internet site, accessed on Aug. 6, 2002, 3 pages.

"IEC: Wireless Intelligent Network (WIN)," printed from http://www.iec.org/online/tutorials/win/topic02.html?Next.x=38&Next.y=13 Internet site, accessed on Aug. 6, 2002, 3 pages.

"IEC: Wireless Intelligent Network (WIN)," printed from http://www.iec.org/online/tutorials/win/topic03.html?Next.x=35&Next.y=14 Internet site, accessed on Aug. 6, 2002, 3 pages.

"IEC: Wireless Intelligent Network (WIN)," printed from http://www.iec.org/online/tutorials/win/topic04.html?Next.x=37&Next.y=17 Internet site, accessed on Aug. 6, 2002, 2 pages.

"IEC: Wireless Intelligent Network (WIN)," printed from http://www.iec.org/online/tutorials/win/topic05.html?Next.x=36&Next.y=13 Internet site, accessed on Aug. 6, 2002, 2 pages.

"Position Location Solutions," printed from www.cdmatech.com/solution/pdf/positionlocation.pdf Internet site, accessed on Jul. 10, 2002, 4 pages.

"SF Bay Traffic.info," printed from http://www.sfbaytraffic.info/aboutus.htm Internet site, accessed on Jun. 10, 2002, 2 pages.

"SF Bay Traffic.info," printed from http://www.sfbaytraffic.info/cgi-bin/welcome.cgi Internet site, accessed on Jun. 10, 2002, 2 pages.

"SF Bay Traffic.info," printed from http://www.sfbaytraffic.info/howitworks.htm Internet site, accessed on Jun. 13, 2002, 2 pages.

"SMS Services," printed from http://www.cointel.co.za/smsservicesframe.htm Internet site, accessed on Jun. 10, 2002, 6 pages.

"Strategis: Press Resources," printed from http://www.strategisgroup.com/press/findings.asp?ObjectId=48624&HomePage=True Internet site, accessed on Jun. 10, 2002, 8 pages.

"TrafficMode.Com," printed from http://www.trafficmode.com/page714214.htm Internet site, accessed on Jun. 10, 2002, 3 pages.

Wang, Jin, et al., "Wireless Voice-over-IP and Implications for Third-Generation Network Design," Bell Labs Technical Journal, Jul.-Sep. 1998, pp. 79-97.

U.S. Appl. No. 10/194,691, filed Jul. 12, 2002.
U.S. Appl. No. 10/237,486, filed Sep. 9, 2002.
U.S. Appl. No. 10/236,489, filed Sep. 6, 2002.
U.S. Appl. No. 10/236,524, filed Sep. 6, 2002.
U.S. Appl. No. 10/237,346, filed Sep. 9, 2002.
U.S. Appl. No. 10/447,030, filed May 28, 2003.

* cited by examiner

FIG. 3

MESSAGE DELIVERY SYSTEMS AND METHODS

BACKGROUND

The present application relates generally to systems and methods for providing messages to a user of a telecommunications device.

It is generally well known that users of prescription drugs often forget to take their medication as prescribed. Studies show that medication non-compliance, defined as the failure to take drugs on time or in the dosages prescribed, is the cause of over 100,000 deaths annually in the United States and leads to billions of dollars of increased medical costs. A variety of systems and tools have evolved for reminding patients to take their medications, and once-popular medication reminder systems such as calendars and alarm clocks have yielded to technological innovation. Talking pillboxes, vibrating alarms, and similar gadgets are widely available and frequently used to ensure that medication is properly taken. As with their predecessors, however, these devices are easily forgotten, misplaced, or simply ignored.

More recently, the number of services offering the delivery of pre-scheduled reminders using voice-messaging systems has been steadily increasing. Often offered by pharmacies to regular customers, these services employ scheduling software and pre-recorded messages to provide medication reminders, known as courtesy calls, using customer information stored in electronic records. As currently implemented, however, such systems suffer a significant drawback because no contingency action is performed in the event that a call recipient fails to answer. In these instances, it may be desirable to alert a designated concerned party concerning the unsuccessful delivery of the medication reminder.

A second drawback to voice messaging systems is the long distance phone charges attendant to the operation of a courtesy call service. Where numerous customers are located outside the area of local phone coverage, as is frequently the case with, for example, mail order and online prescription services, the costs associated with delivering courtesy calls to distant customers may be prohibitively expensive. Although electronic mail is a cost-effective solution to long-distance telephone fees, the difficulty of verifying customer receipt of the communication makes it a less attractive alternative. Moreover, although the popularity of electronic mail has been growing rapidly, it has not yet found common use in many homes.

SUMMARY

In one embodiment, the present invention is directed to an apparatus for allowing a calling party to transmit a message for scheduled delivery from a network-enabled device. The apparatus includes a server for receiving a message request in response to a command from the network-enabled device, for generating one or more message addresses from the message request, and for transmitting the message request to one or more telecommunication networks corresponding to the one or more message addresses.

In one embodiment, the present invention is directed to a method for allowing a calling party to transmit a message for scheduled delivery from a network-enabled device. The method includes receiving a message request containing a first directory number of a primary recipient, a second directory number of an alternate recipient, and a message and generating one or more message addresses from the message request. The method also includes transmitting the message request to the one or more telecommunication networks corresponding to the one or more message addresses.

In one embodiment, the present invention is directed to an apparatus for allowing a calling party to transmit a message for scheduled delivery from a network-enabled device. The apparatus includes means for receiving a message request in response to a command from the Network-enabled device and means for generating one or more message addresses from the message request. The apparatus also includes means for transmitting the message request to one or more telecommunication networks corresponding to the one or more message addresses.

In one embodiment, the present invention is directed to a system for allowing a calling party to transmit a message for scheduled delivery from a network-enabled device. The system includes a telecommunications network, an IP network in communication with the Network-enabled device, and a server for receiving a message request in response to a command from the Network-enabled device, for generating one or more message addresses from the message request, and for transmitting the message request to a telecommunications network corresponding to the one or more message addresses.

In one embodiment, the present invention is directed to a computer-readable medium having stored thereon instructions which, when executed by a processor, causes the processor to receive a message request in response to a command from the Network-enabled device, generate one or more message addresses from the message request, and transmit the message request to one or more telecommunication networks corresponding to the one or more message addresses.

BRIEF DESCRIPTION OF THE FIGURES

The present disclosure will be described in conjunction with the following figures, wherein.

DETAILED DESCRIPTION

The term "calling party" is used herein to generally refer to the person or unit that initiates a call or communication. The calling party may also be referred to herein as "caller" or "customer." In some cases, the calling party may not be a person, but may be a device such as a facsimile machine, an answering service, a modem, etc. The term "recipient" is used herein generally to refer to the person or unit that answers or responds to the call or communication. The term "communication" is used herein to include all messages or calls that may be exchanged between a calling party and a recipient, including voice, data and video messages. The term "communication" is used synonymously herein with the term "message" unless a distinction is noted.

The present invention, according to one embodiment, is directed to a security and prescription drug call system and method for allowing a calling party to transmit a message from a network-enabled communication device for scheduled delivery via a circuit-switched telephone network. According to one embodiment, the calling party first enters the message request via a user interface available on the network-enabled device. The message request may include a message header containing delivery information, and a message body containing the message content to be conveyed to a recipient. The delivery information may include the directory numbers of a primary recipient and an alternate recipient, a schedule for delivery, and the number of delivery retries to be made if the primary recipient fails to answer. The message content may include a text message or a file attachment containing a voice message. The calling party next transmits the message request to a message server, which resolves the directory numbers of the primary and alternate recipients into their corresponding message addresses. The message request is then transmitted to a voice messaging system identified by the message address of the primary recipient. The voice messaging system processes the message request and delivers the message content to the primary recipient via an associated circuit-switched telephone network according to the schedule contained in the message header. If the primary recipient fails to answer after the specified number of delivery retries has been made, the voice messaging system notifies the message server of the unsuccessful delivery. A notice of the unsuccessful delivery is then transmitted to a voice messaging system identified by the message address of the alternate recipient, processed, and delivered to the alternate recipient.

According to one embodiment, the present invention utilizes the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. Before describing further details of the present invention, a description of the AIN is provided.

Figure 1:
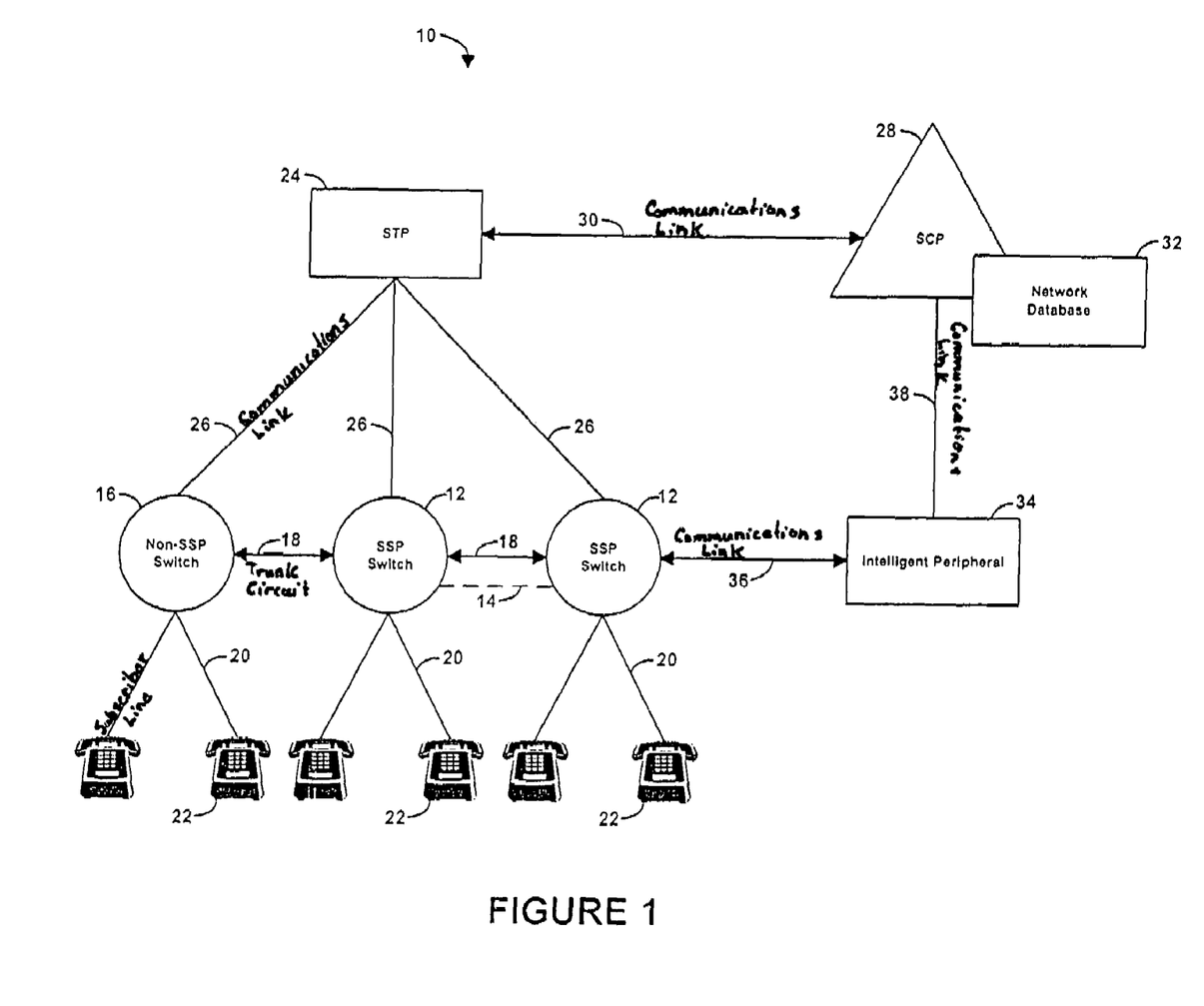
FIG. 1 illustrates an embodiment of an Advanced Intelligent Network.

FIG. 1 is a block diagram of an Advanced Intelligent Network (AIN) 10 for integration with the public switched telephone network (PSTN). The AIN 10 may be employed by a Local Exchange Carrier (LEC), and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. The number of subscriber lines 20 connected to each switch 12, 16 may be on the order of ten thousand to one hundred thousand lines. Each of the subscriber lines 20 is connected to a terminating piece of customer premises equipment, represented in FIG. 1 by the landline telephones 22. Alternatively, the terminating equipment may be another type of telecommunications unit such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link 26. The communication link 26 may employ, for example, the SS7 switching protocol. The STP 24 may be a multi-port high-speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services, such as the security and prescription drug call service described by the present invention. The subscriber information contained in the network database 32 may be structured in accordance with a standard directory model such as, for example, the Lightweight Directory Access Protocol (LDAP). In addition to providing information to the SSP switches 12 as discussed below, the SCP 28 may also provide information in response to queries originating from a non-AIN network in communication with the SCP 28.

The AIN 10 illustrated in FIG. 1 also includes an intelligent peripheral device (IP) 34. The IP 34 may be a services node such as, for example, a Compact Services Node (CSN) available from Lucent Technologies Inc., Murray Hill, N.J., although the IP 34 may be any other type of available AIN-compliant intelligent peripheral device. The IP 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit. The SCP 28 may execute the control and logical sequence of the interaction between the IP 34 and the SSP 12 via a communication link 38 employing, for example, the SS7 switching protocol. The IP 34 may also support Dual Tone Multi-Frequency (DTMF) signal recognition and generation and may initiate communication with the SSP 12 without the involvement of the SCP 28.

The IP 34 may be used primarily when some enhanced feature or service is needed that requires an audio connection to the call such as, for example, the call return and calling name services. Similar to the SCP 28, the intelligent functionality of the IP 34 may be realized by programmable applications executable by the IP 34.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the network database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the IP 34, the return message from the SCP 28 may include instructions for the SSP switch 12 to route the call to the IP 34. In addition, the return message from the SCP 28 may simply be an indication that there is no entry in the network database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one IP 34, although the AIN 10 may further include an additional number of these components as well as other network components, which are not included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
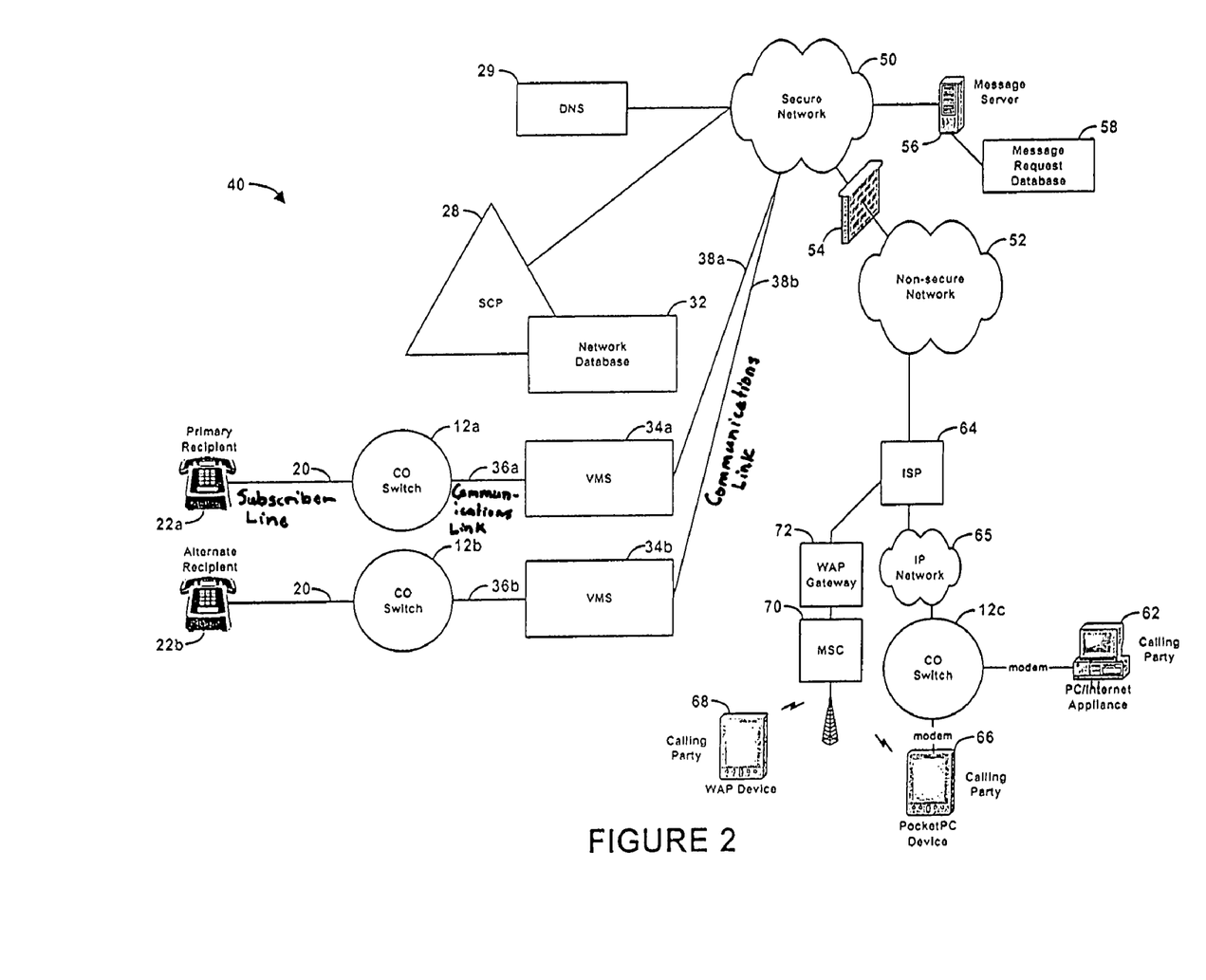
FIG. 2 illustrates an embodiment of a prescription and security drug call system of the present invention.

FIG. 2 is a diagram illustrating a system 40 according to one embodiment of the security and prescription drug call service of the present invention. The system 40 includes portions of the AIN described in conjunction with FIG. 1, including SSP switches 12a–c (designated as "CO SWITCH"), a SCP 28, and IP devices 34a–b. In order to implement the system described by the present invention, the IP devices 34a–b may be voice messaging systems (VMSs), such as, for example, IMA-CA voice network servers available from Lucent Technologies Inc., Murray Hill, N.J. The VMSs 34a–b may communicate with the CO switches 12a–b via communication links 36a–b and be used to provide voice services such as, for example, telephone answering, voice messaging, and message delivery. Additionally, the VMSs 34a–b may provide or be able to access advanced speech processing resources such as, for example, automatic speech recognition (ASR) and text-to speech (TTS) synthesis.

The system 40 may include one or more gateways (not shown) and one or more softswitches (not shown) in communication with components of the AIN, including, for example, the VMSs 34a–b and/or the CO switches 12a–b. Each gateway may be, for example, an SS7/IP gateway for performing protocol conversions between the SS7 and IP (Internet Protocol) protocols. Each softswitch may be a programmable network switch that can process all types of packet protocols. In addition, according to other embodiments of the invention, each of the CO switches 12a–b may instead be a softswitch, although embodiments of the present invention will be described hereinafter as if the switches in communication with telephone devices 22a–b are CO switches.

For purposes of describing features of the present invention, the calling party is a user of a wireless or wireline network-enabled communication device 62, 66, 68 (e.g. an Internet-enabled device). The primary recipient is a user of a telephone 22a and the alternate recipient is a user of a second telephone 22b. According to one embodiment, the present invention allows the calling party to transmit a message from a network-enabled communication device 62, 66, 68 for scheduled delivery to the primary recipient via telephone 22a. The network-enabled communication device 62, 66, 68 may be, for example, a personal computer (PC) 62 such as, for example, a Dell Dimension computer with a Microsoft® Windows® operating system. The PC 62 may be connected to a non-secure network 52 through an Internet service provider (ISP) 64. The PC 62 may be in communication with the ISP 64 through, for example, a CO switch 12c and an Internet protocol (IP) network 65. The non-secure network 52 may be, for example, the Internet. Examples of other devices that may be used in accordance with the present invention include pocket PC devices 66, wireless application protocol (WAP) devices 68, personal digital assistants (PDA's) (not shown), and interactive pagers (not shown). The WAP device 68 may be connected to the non-secure network 52 via a mobile switching center (MSC) 70 and a WAP gateway 72, in communication with the ISP 64. Other types of devices including, for example, the pocket PC device 66 may access the non-secure network 52 through a wireless front-end interface. For clarity, embodiments of the present invention described below utilize the PC 62. Those skilled in the art will recognize that other network-enabled communication devices may be used instead. Additionally, the telephones of the primary and alternate recipients 22a–b may be any devices or systems capable of receiving telephone communications.

The system 40 may also include a secure network 50 in communication with the non-secure network 52. The secure network 50 may be a secure IP network such as, for example, a secure intranet. In communication with the secure network 50 may be one or more SCPs 28 of the AIN 10. To maintain the security of the secure network 50, a firewall 54 may be provided between the secure network 50 and the non-secure network 52.

Also in communication with the secure network 50 may be a general-purpose computer 56 (hereinafter "message server"). The message server 56 may have one or more associated databases, shown generally at 58 in FIG. 2. According to one embodiment, the message server 56 may be any type of computer capable of communicating with the PC 62 and other network devices and databases via either the secure network 50 and the non-secure network 52. Message server 56 functions may include authenticating the identity of the calling party and providing a user interface for data entry and navigation via the PC 62. The message server 56 may also execute a software application such as, for example, Microsoft® SQL Server for performing database tasks. The database 58 associated with the message server 56 (hereinafter "Message Request Database") may store message requests transmitted from the PC 62, along with other information as discussed below. Although the system 40 as shown in FIG. 2 includes only one message server 56 for performing communication and database tasks, those skilled in the art will recognize that two or more networked computers may perform these tasks separately instead.

The secure network 50 may communicate each VMS 34a–b via communication links 38a–b. As discussed above with respect to the AIN 10 of FIG. 1, the SCP 28 may perform control and logical sequencing for the interaction between each VMS 34a–b and its respective CO switch 12a–b via the secure network 50 and the communication links 38a–b. The communication links 38a–b may further allow the exchange of communications between the message server 56 and each VMS 34a–b via the secure network 50.

The system 40 may further include a domain name server (DNS) 29. The DNS 29 may be comprised of one or more networked computers for providing the location of a variety of information resources such as documents, images, files, and databases in response to a domain name query received from another computer. As shown in FIG. 2, the DNS 29 may be deployed on the secure network to prevent unauthorized access by users of the non-secure network 52. Alternatively, the DNS 29 may be deployed on the non-secure network and be accessible to users of both the secure network 50 and non-secure networks 52.

In order to implement the system described by the present invention, the DNS 29 may utilize a mapping protocol such as, for example, the ENUM protocol adopted by the Internet Engineering Task Force (IETF). The ENUM protocol defines a procedure by which a directory number may be converted into a valid domain name. Upon receiving a query generated by applying the ENUM procedure to a directory number, the DNS 29 may return the location of information resources associated with the directory number. The result of an ENUM query may be, for example, the IP address of the SCP 28 containing the network database 32 in which subscriber information associated with the directory number is stored. The desired subscriber information may then be retrieved from the network database 32 by querying the network database 32 of the SCP 28 using, for example, a LDAP query.

Figure 3:
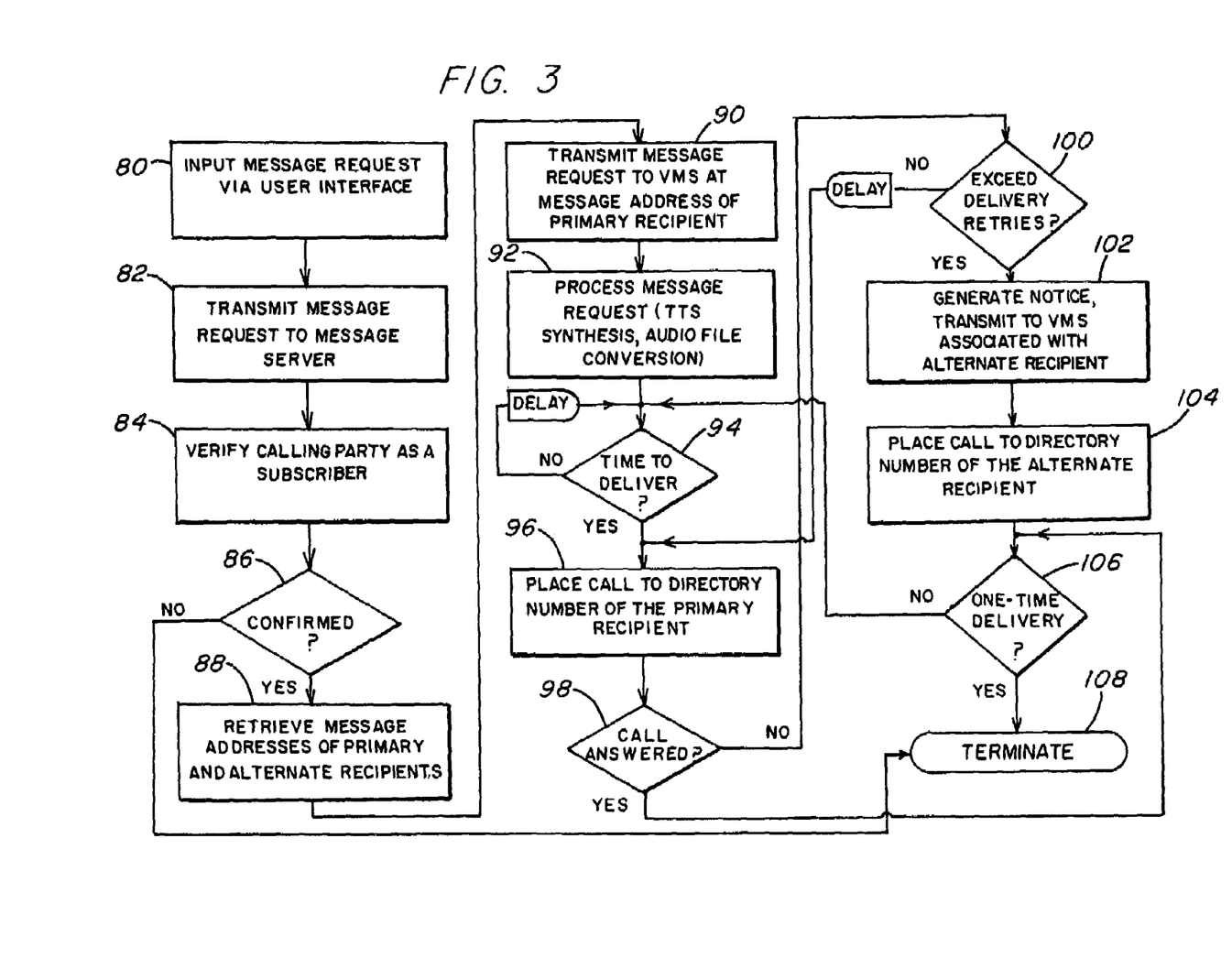
FIG. 3 illustrates an embodiment of a flow through the system of FIG. 2.

FIG. 3 illustrates an embodiment of a flow through the system of FIG. 2. At step 80, the calling party first enters the message request via a user interface available on the PC 62. The software application supporting the user interface may reside directly on the PC 62. Alternatively, the message server 56 may host the software application supporting the user interface and the calling party may use browser software residing on the PC 62 such as, for example, Windows Internet Explorer, to access the user interface.

As discussed above, the message request may include a message header into which requested delivery information is entered. One aspect of the delivery information entered by the calling party is the directory numbers of the primary and alternate recipients. In one embodiment, the directory numbers may be, for example, 10-digit telephone numbers corresponding to the telephones 22a–b of the primary and alternate recipients. In another embodiment, the directory numbers may be telephone numbers that comply with the E.164 recommendation of the International Telecommunication Union (ITU). Additionally, because the security and prescription drug call service described by the present invention may only be available for a fee, the calling party may further be required to enter their own directory number and/or a personal identification number (PIN) for purposes of subscriber verification.

A second aspect of the delivery information to be entered by the calling party is a schedule for message delivery. If the message is to be delivered to the primary recipient one time only, the schedule may include a time and date to perform the delivery. If the message is to be delivered to the primary recipient more than once, the schedule may include a time interval defined by a start date and a stop date, as well as the time or times at which to deliver the message within the defined time interval. Correspondingly, the schedule may include a start date, the time or times at which to deliver the message, and the number of message deliveries to be performed.

A third aspect of the delivery information to be entered by the calling party is the number of delivery retries to be made if the primary recipient fails to answer.

In addition to the message header, the message request may also include message content to be conveyed to the recipient. The message content may be, for example, a text message entered using a keyboard or other data entry device. Alternatively, the message content may be an audio file attachment such as, for example, a .wav file.

As shown at step 82, the calling party may transmit the message request from the PC 62 to the message server 56 by selecting, for example, a "Send" option provided by the user interface. The message request may constitute only one aspect of the information transmitted from the PC 62 to the message server 56. Additional information transmitted may include the IP address of the PC 62 and the email address associated with the calling party. The user interface may also include "Edit" and "Delete" options to allow the calling party to edit, update, or delete message requests that have already been transmitted to the message server 56.

After receiving the message request and any additional information transmitted from the PC 62, the message server 56 may create one or more entries in the Message Request Database 58 for storing the contents of the transmission. Before further processing the call request, it may be necessary to verify that the calling party is a subscriber to the security and prescription drug call service of the present invention at step 84. Accordingly, the message server 56 may first query the DNS 29 to determine the IP address of the SCP 28 containing the calling party's subscriber information. The query may be, for example, an ENUM query. For clarity, the system 40 of FIG. 2 shows only one SCP 28 and associated database 32. In practice, subscriber information may be distributed across a plurality of networked SCPs 28 and associated databases 32.

After the DNS 29 returns the IP address of the SCP 28, the message server 56 may then query the SCP 28 to retrieve the PIN from the subscriber profile identified by the calling party's directory number. As discussed above, the subscriber information contained in the network database 32 may be structured in accordance with a standard directory model such as, for example, the Lightweight Directory Access Protocol (LDAP). If the result of the query indicates that the calling party is a subscriber at step 86, a confirmation may be communicated to the PC 62 using the corresponding IP and/or email address stored in the Message Request Database 58. If the result of the query indicates that the calling party is not a subscriber, the calling party may be notified accordingly and the transaction terminated at step 108.

If the calling party is confirmed as a subscriber, the message server 56 may query the DNS 29 to determine the IP address of each SCP 28 containing subscriber information for the primary and alternate recipients. After the DNS 32 returns the IP addresses, the message server 56 may query each SCP 28 to retrieve a message address from each subscriber profile identified by the directory numbers of the primary and alternate recipients at step 88. The message addresses may be, for example, IP addresses for routing messages to the VMSs 34a–b. The message addresses may then be appended to the one or more entries previously created in the Message Request Database 58. In the event that a SCP 28 query returns no message address, the calling party may be notified accordingly. After the message addresses of the primary and alternate recipients have been determined, the message request may be transmitted from the Message Request Database 58 to the VMS 34a associated with the primary recipient at step 90 via the secure network 50 and the communication link 38a.

Although not illustrated in FIG. 3, intermediate processing by the message server 56 may not be required, and the calling party may transmit the message request directly to the VMS 34a associated with the primary recipient. For example, the software application supporting the user interface on the PC 62 may apply the ENUM procedure to the directory numbers of the primary and alternate recipients as they are entered, and the resulting domain names may be appended to the delivery information. The message request may then be transmitted as an email message to a computer (not shown) in communication with the secure network 50 such as, for example, a Simple Mail Transfer Protocol (SMTP) server. Using mail exchange (MX) records, the SMTP server may route the message request to the VMS 34a of the primary recipient via the secure network 50 and the communication link 38a.

The VMS 34a may support a messaging application such as, for example, outdial notification for delivering the message content according to the delivery information contained in the message header. If the message content is a text message, the VMS 34a may implement TTS synthesis at step 92 to convert the text message into a voice message. Alternatively, if the message content is an audio file attachment, step 92 may include converting the file into a format compatible with the VMS 34a messaging application. As shown at steps 94 and 96, at the time specified in the delivery schedule the VMS 34a may place a call to the directory number of the primary recipient using, for example, DTMF signal generation. Upon sensing the off-hook condition of the telephone 22a, the VMS 34a may play the voice message derived from the message content. If the telephone 22a is busy or the call is not answered after a fixed number of rings, the VMS 34a will attempt to re-deliver the voice message at delayed time intervals until the call is answered or the number of call retries specified in the delivery information has been made, as shown in steps 100 and 96 respectively. If the primary recipient answers the call at step 98 and receives the message, the service will be terminated only if the message was scheduled for one-time delivery, as seen at steps 106 and 108. Otherwise, the VMS 34a will continue to deliver the message in accordance with the delivery schedule, as seen at steps 106, 94, and 96 respectively.

If the voice message cannot be delivered to the recipient within the specified number of call retries at step 100, the VMS 34a may notify the message server 56 of the unsuccessful delivery via the communication link 38a and the secure network 50. In response, the message server 56 at step 102 may generate and transmit a notice of unsuccessful delivery (hereinafter "Notice") to the VMS 34b associated with the message address of the alternate recipient via the secure network 50 and communication link 38b. The format of the notice may be analogous to that of the message request and include header and content portions. The notice header may contain the directory number of the alternate recipient, and the notice content may be, for example, a text message identifying the directory number of the primary recipient and stating that the primary recipient failed to receive the scheduled message. The text message may further request that the alternate recipient immediately inform the primary recipient of the unsuccessful message delivery. The VMS 34b may implement TTS synthesis to convert the text message into a voice message. The VMS 34b may then place a call to the directory number of the alternative recipient and play the voice message derived from the content of the notice, as shown at step 104. If the message was scheduled for one-time delivery, the service will be terminated as shown in steps 106 and 108. Otherwise, the VMS 34a will continue delivering the message in accordance with the delivery schedule, as shown at steps 106, 94, and 96 respectively.

In one embodiment, the security and prescription drug call system of the present invention may be available to pharmacies as an enhanced service offered by a telephone service provider. A pharmacy subscribing to this service may provide each customer the option of receiving one or more medication reminder messages. A customer requesting a reminder message would first be asked to provide their telephone number and that of the primary recipient, along with the telephone number of an alternate recipient, such as a friend or loved one. The customer may next be asked to supply the number of call retries to be made before the alternate recipient is contacted. The information required for scheduling the delivery of the reminder message, as well as the reminder message content, may be supplied by the pharmacy based upon the information contained in the customer's prescription.

In another embodiment, the security and prescription drug call system of the present invention may be generally available to any residential telephone subscriber as an enhanced service offered by their telephone service provider. Working parents, for example, may use the service to schedule security messages for delivery to their children when at home alone after school. In the event that the security message remains unanswered after a specified number of delivery retries, an alternate recipient such as a neighbor, relative, or parent may be notified of the unsuccessful message delivery and requested to take appropriate action.

It is to be understood that the present description illustrates those aspects of the invention relevant to a clear understanding of the invention. Certain aspects of the invention that would be apparent to those of ordinary skill in the art and that, therefore, would not facilitate a better understanding of the invention, have not been presented in order to simplify the present description. Although the present invention has been described in connection with certain embodiments, those of ordinary skill in the art will, upon considering the foregoing description, recognize that many modifications and variations of the invention may be employed. It is intended that all such variations and modifications of the inventions be covered by the foregoing description and following claims.

What is claimed is:

1. A method for allowing a requestor to establish a message for scheduled delivery via a network-enabled device, the method comprising:

receiving a message request, the message request including, a first destination address for a primary recipient, a second destination address for an alternate recipient, a schedule for delivery, information identifying the requester, and message content, wherein the message content is edited and deleted by the requestor after being received;

authenticating the requestor based on the information identifying the requester;

determining a first routing address of an intelligent peripheral device associated with the primary recipient based on the first destination address for the primary recipient; and transmitting the message request to the intelligent peripheral device associated with the primary recipient, wherein the message content is converted at the intelligent peripheral from text to voice and vice versa as required by the primary recipient;

determining a second routing address of a second intelligent peripheral device associated with the alternate recipient based on the second destination address for the alternate recipient if there is no answer in response to a call placed to the primary address;

transmitting the message request to the second intelligent peripheral device associated with the alternate recipient if there is no answer in response to a call placed to the primary address; and sending the message content from the second intelligent peripheral device to the alternate recipient if there is no answer in response to a call placed to the primary address, wherein the message content is converted at the second intelligent peripheral from text to voice and vice versa as required by the alternate recipient.

2. The method of claim 1, further comprising receiving a notification of unsuccessful message delivery from the intelligent peripheral device.

3. The method of claim 1, further comprising sending the message content from the intelligent peripheral device to the primary recipient according to the schedule for delivery.

4. The method of claim 1, wherein the schedule for delivery includes at least one of a time for delivery, a date for delivery, a time interval for delivery, and a number of delivery retries to be made if the primary recipient cannot be reached.

5. The method of claim 1, wherein the determining step is performed according to the ENUM protocol.

6. The method of claim 1, wherein the transmitting step further comprises routing the message request through one or more softswitches.

7. The method of claim 1, wherein the network-enabled device is at least one of a telephone, a personal computer, an Internet appliance, a pocket PC device, a wireless application protocol (WAP) device, a personal digital assistant, and an interactive pager.

8. The method of claim 1, wherein at least one of the first destination address for the primary recipient and the second destination address for the alternate recipient includes an address of a telecommunications device.

9. The method of claim 8, wherein the telecommunications device is at least one of a telephone, a personal computer, an Internet appliance, a pocket PC device, a wireless application protocol (WAP) device, a personal digital assistant, and an interactive pager.

10. A system for allowing a requestor to establish a message for scheduled delivery via a network-enabled device, the system comprising:

a message server configured for:

receiving a message request, the message request including, a first destination address for a primary callee, and message content, wherein the message content is edited and deleted by the requester after being received;

determining a first routing address of an intelligent peripheral device associated with the primary callee based on the first destination address for the primary callee; and transmitting the message request to the intelligent peripheral device associated with the primary callee;

the intelligent peripheral device configured for:

receiving the message request from the message server;

sending the message content to the primary callee;

converting the message content from text to voice and vice versa as required by the primary recipient;

determining a second routing address of a second intelligent peripheral device associated with an alternate callee based on the second destination address for the alternate callee if there is no answer in response to a call placed to the primary callee at the first destination; and transmitting the message request to the second intelligent peripheral device if there is no answer in response to a call placed to the primary callee at the first destination address; and converting the message content from text to voice and vice versa as required by the alternate recipient, and an SCP hosting a network database in communication with the message server, the first intelligent peripheral and the second intelligent peripheral, wherein the SCP implements routing between the message server and the primary and alternate callees and stores callee routing information.

11. The system of claim 10, wherein the message request further includes information identifying the requester, and wherein the message server is further configured for authenticating the requestor based on the information identifying the requester.

12. The system of claim 10, wherein the message request further includes a schedule for delivery.

13. The system of claim 12, wherein the schedule for delivery includes at least one of a time for delivery, a date for delivery, a time interval for delivery, and a number of delivery retries to be made if the primary callee cannot be reached.

14. The system of claim 10, wherein the intelligent peripheral device is further configured to notify the message server if the primary callee cannot be reached.

15. The system of claim 10, wherein the message server is further configured for determining the first routing address of the intelligent peripheral device associated with the primary callee according to the ENUM protocol.

16. The system of claim 10, further comprising one or more softswitches for transmitting the message request between the message server and the intelligent peripheral.

17. The system of claim 10, wherein the message server provides a web based graphical user interface to allow a user to submit the message request by accessing the web based graphical user interface over the Internet and providing textual information of the message request into the web based graphical user interface and wherein the message server performs a text to speech translation of the textual information to provide an audible message to the primary recipient.

18. A computer readable medium having stored thereon instructions which, when executed by a processor, cause the processor to perform the steps of:

receiving a message request, the message request including, a first destination address for a primary recipient, a second destination address for an alternate recipient, a schedule for delivery, information identifying the requestor, and message content, wherein the message content is edited and deleted by the requestor after being received;

authenticating the requestor based on the information identifying the requestor;

determining a first routing address of an intelligent peripheral device associated with the primary recipient based on the first destination address for the primary recipient;

transmitting the message request to the intelligent peripheral device associated with the primary recipient, wherein the message content is converted at the intelligent peripheral from text to voice and vice versa as required by the primary recipient;

determining a second routing address of a second intelligent peripheral device associated with the alternate recipient based on the second destination address for the alternate recipient if there is no answer in response to a call placed to the primary address; and transmitting the message request to the second intelligent peripheral device associated with the alternate recipient if there is no answer in response to a call placed to the primary address, wherein the message content is converted at the second intelligent peripheral from text to voice and vice versa as required by the alternate recipient.

* * * * *